No. 682,647. Patented Sept. 17, 1901.
T. SCULLIN.
TRUCK.
(Application filed May 27, 1901.)
(No Model.)
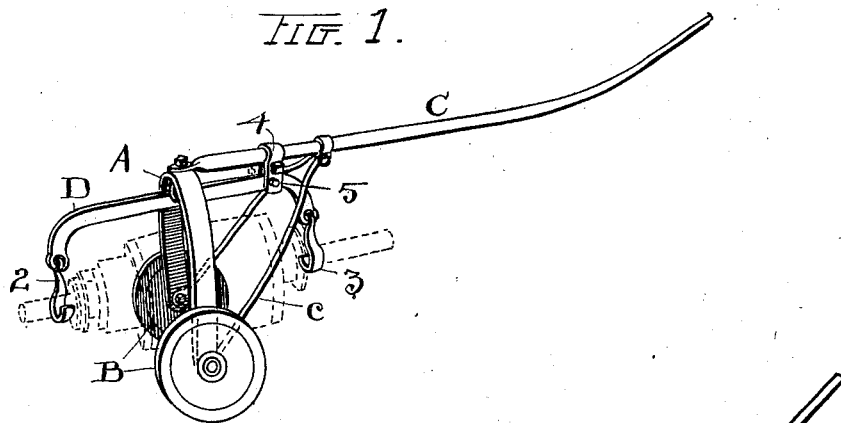
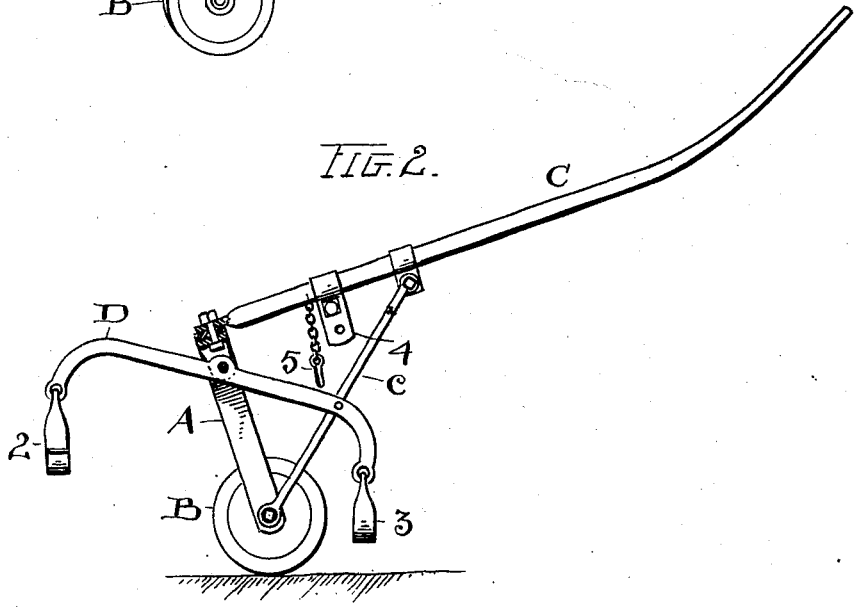
ATTEST.
T. B. Moser
H. E. Mudra.
INVENTOR.
Terance Scullin
By N. T. Fisher ATTY
THE NORRIS PETERS CO., PHOTO-LITHO., WASHINGTON, D. C.

UNITED STATES PATENT OFFICE.

TERANCE SCULLIN, OF CLEVELAND, OHIO, ASSIGNOR TO FRANK HORSBURGH, OF SAME PLACE.

TRUCK.

SPECIFICATION forming part of Letters Patent No. 682,647, dated September 17, 1901.

Application filed May 27, 1901. Serial No. 62,040. (No model.)

*To all whom it may concern:*

Be it known that I, TERANCE SCULLIN, a citizen of the United States, residing at Cleveland, in the county of Cuyahoga and State of Ohio, have invented certain new and useful Improvements in Trucks; and I do declare that the following is a full, clear, and exact description of the invention, which will enable others skilled in the art to which it appertains to make and use the same.

My invention relates to trucks for handling armatures for electric generators and motors as well as other heavy objects, all substantially as shown and described, and particularly pointed out in the claims.

In the accompanying drawings, Figure 1 is a perspective elevation of my improved truck and of an armature shown in dotted lines and as it appears when carried by the truck. Fig. 2 is a cross-section of the truck front to rear off its center, having the tongue and balancing or carrying beam for the load in their working relations.

As armatures run they are exceedingly heavy for their size, even though they be relatively small, and for the larger sizes of generators and motors they come to be of such exceedingly great weight that only a correspondingly strong mechanism is sufficient for handling them. Different expedients have been resorted to for this purpose here and there in factories and other places, and in some instances I have known of one or another kind of wheeled carrier being tried or employed for this purpose; but I am not aware that any one has ever known or used a truck constructed, equipped, or operating on the principle of my invention prior to my own conception and use thereof. As thus constructed I employ a single arched or bowed axle A of substantially U shape and provided with spindles at its ends for wheels B, which come outside the axle. These need not be large, though they may be relatively much larger than here shown; but they need to be strong, as do also their spindles, to sustain heavy loads. The space between the sides of the axle-arch may be governed somewhat by the size and kind of articles to be handled; but compactness within limits is desirable.

C is a tongue or handle fixed in this case to the top or arch of the axle and supported by braces *c* from the sides of the axle and preferably from a low point near the wheels. The said tongue might, however, be differently fashioned and braced from what is here shown and serve my purpose as well, so that this is not the limitation of the invention so far as the tongue and its connections are concerned.

D represents the balancing or carrying beam or yoke, which takes the load. This part is necessarily strong and in the present instance has downwardly turned or bent ends provided with pivoted hooks 2 and 3, respectively, in reverse positions sidewise, so that one engages toward the right and the other toward the left, as viewed from a front or rear position. Said beam is pivotally suspended at or about midway of its length at or from the center of the axle-arch, and the pivot therefor may be a swivel, so as to both rotate and tilt or be limited to an up-and-down or tilting movement only. It is thus limited here.

By having the arch raised fairly high I can run the truck over a correspondingly high object or load in order to bring it within the grip of the beam, and by bringing the hooks 2 and 3 down relatively as low as here shown they are brought into gripping position without lifting the load by hand or otherwise in order to make hooking engagement with or upon the beam. Incident to this and the hauling of the load is the mechanism for positively engaging the inner end of the beam with tongue C, whereby control of the load is obtained. Any sufficient means may be adopted for this purpose; but I show here a clip 4, fixed on the tongue and adapted to receive beam D within its sides, and a pin 5 through holes in the clip and beam temporarily fastens them together. It will of course be observed that the load is not placed on the truck, but that it is suspended therefrom, and that it is picked up and let down again by means of the truck itself through a peculiar handling thereof, made possible by the construction and operation of the parts, as shown and described. Thus, as shown, it will be seen that pivoted beam D is held in line with tongue C and so that it may tilt, but not swing laterally. This gives said beam only an up-and-down movement on its pivot. Now, supposing that the truck has been run back over the armature to proper position to engage its shaft, the tongue is raised at its point sufficiently to let the axle and beam down backward somewhat, when first, say, the rear hook 2 is swung into engagement and then hook 3 at the front, and all this can be done by simply manipulating the truck through its tongue. Then by lowering the outer end of the tongue a leverage is produced which bodily raises the load for hauling. In armatures the load will balance generally; but to insure holding up at both ends the beam is locked on the tongue. The beam D is presumably balanced, or substantially so, when loaded, so that the office of clip 4 and pin 5, or their equivalent, is simply to sustain the load in its carrying position. Hence the means for doing this may be varied only so that they be convenient and sufficient.

What I claim is—

1. The truck having an arched axle and a tongue rigid with said axle, a carrying-beam pivoted at its center in the top of the axle and means to fasten the inner end of the said beam in raised position, substantially as described.

2. The truck substantially as shown and described, consisting of an arched axle and carrying-wheels at the ends thereof and a tongue fixed rigidly to the axle, and a beam pivoted at its middle in the arch of the axle and having oppositely-arranged hooks at its ends, and means to temporarily fasten one end of said beam to prevent tilting when the load is on, substantially as described.

Witness my hand to the foregoing specification this 21st day of May, 1901.

TERANCE SCULLIN.

Witnesses:
R. B. MOSER,
H. E. MUDRA.